June 16, 1931. A. V. DA COSTA 1,810,465
VALVE MOTION MECHANISM FOR INTERNAL COMBUSTION ENGINES
Filed Aug. 20, 1928
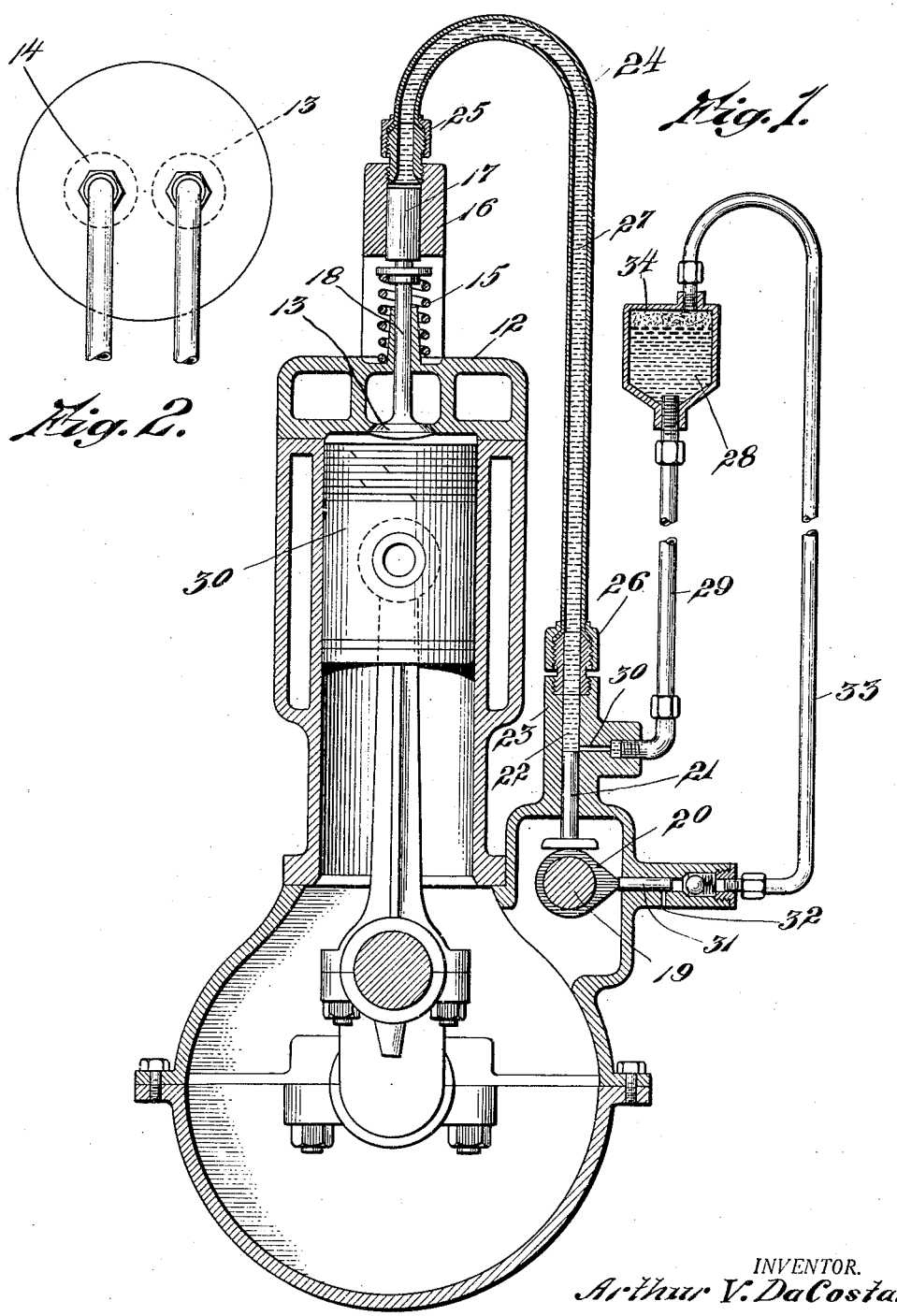
INVENTOR.
Arthur V. DaCosta.
BY Barlow & Barlow
ATTORNEYS.

Patented June 16, 1931

1,810,465

UNITED STATES PATENT OFFICE

ARTHUR V. DA COSTA, OF PROVIDENCE, RHODE ISLAND, ASSIGNOR TO DA COSTA ENGINE COMPANY, OF PROVIDENCE, RHODE ISLAND, A CORPORATION OF RHODE ISLAND

VALVE MOTION MECHANISM FOR INTERNAL COMBUSTION ENGINES

Application filed August 20, 1928. Serial No. 300,736.

This invention relates to improvements in valve operating mechanism for engines; and has for its object to provide a hydraulic column confined in a tube and thru which column motion is transmitted from the operating cam to the valve to eliminate mechanical connections between the cam and the valve and so reduce lost motion, noise and wear of these associated parts to the very minimum.

A further object of the invention is to provide simple and effective means for maintaining the motion transmitting column intact to eliminate lost motion between the cam and the valve.

The invention further consists in the provision of a plunger associated with the valve and one associated with the cam, and a tube connecting this plunger and carrying a column of substantially non-compressible fluid such as oil to move by action of the cam to control the opening of the valve a port being formed in the tube thru which the column is supplied and the tube maintained filled with fluid from a chamber, the port opening being controlled by movement of one of the plungers.

A further object of the invention is the provision of means for creating pressure in the chamber, which supplies fluid to the main transmitting fluid column.

The invention further consists in the provision of hydraulic motion transmitting device which comprises a pair of spaced plungers connected by a liquid column thru which the plungers are moved, the column being replenished from an auxiliary reservoir thru a port, the opening thru this port being controlled by the action of one of the plungers whereby the first part of the power stroke of the plunger closes the port and the last part of the return stroke of the plunger opens this port.

With these and other objects in view, the invention consists of certain novel features of construction, as will be more fully described, and particularly pointed out in the appended claims.

In the accompanying drawings:

Fig. 1 is an elevation partly in section illustrating my improved hydraulic motion transmitting mechanism as applied to internal combustion engines.

Fig. 2 is a top view of the engine cylinder showing two valves in the head with both of which a fluid filled tube is arranged to communicate.

It is found in the practical operation of valves more particularly the so-called "overhead" valves, that the greatest objection to this type of valve is the more complicated mechanism for operating the same, which offers greater opportunities for wear and lost motion and which parts are also affected by the constantly changing temperature of the engine parts, which changes cause the valves to get out of time with the piston due to continual extension and contraction of the surrounding metal parts. For instance, when the motor is climbing a hill it becomes much warmer than when going down an incline and the resulting elongating and shortening of the cylinder and the valve connecting parts are bound to vary and thus cause the valve to be out of time with the piston, whereby the engine is only occasionally at its maximum efficiency.

In order to obviate many of these difficulties in transmitting motion of the valve cams to the valves, I have eliminated all of the connecting parts such as the rocker arms, the rocker pins and lift rods, and have substituted in place thereof a non-compressible column of liquid such as oil. One end of the oil column has a plunger communicating with the cam and at the other end of the column is a plunger communicating with the valve whereby a movement of the cam is transmitted through the column directed to the valve without lost motion; also the uneven expansion of the metal parts and the oil column is compensated for by an auxiliary liquid supply means which is herein shown as being controlled by the rise and fall of the cam plunger. For instance, when the plunger drops to extreme position it opens a communicating port to admit such liquid that may be necessary to replenish or maintain the column full and as this plunger rises, that portion not required to fill the column is forced back into this chamber, whereby the continued upward movement of this plunger acts through the continuous column to open the valve at exactly the proper time, the valve spring causing the column to flow back and follow the cam.

By this construction the surplus due to the expansion of the oil when heated flows out into this chamber and the amount due to leakage is always replaced at every stroke from this chamber, thus this motion transmitting column automatically adjusts itself and operates the valve without lost motion; and the following is a detailed description of the present embodiment of my invention and showing one means by which these advantageous results may be accomplished:

With reference to the drawings, 10 designates the engine cylinder which is mounted upon the crank case 11 and on the upper end of the cylinder is mounted the head 12 in which are located the valves 13 and 14.

Each of these valves is pressed towards closed position by the use of coil spring 15. In the support 16 above the valve head I have mounted a plunger 17 which rests upon the upper end of the valve stem 18. Communicating with the crank case 11 is the cam shaft 19 which is operated in time with the crank shaft by gears (not shown).

On this cam shaft is mounted the usual valve operating cams 20, each of which is arranged to act upon its plunger 21, causing it to reciprocate in its bore 22 in the member 23. This member 23 and the member 16 are connected through the tube 24 by unions 25 and 26 and this tube is completely filled with fluid preferably oil which is substantially non-compressible thus providing an oil column 27 adapted to transmit motion from the plunger 21 to the plunger 17 to open the valve 13 when the cam 20 lifts the first mentioned plunger. Both of these plungers 17 and 21 are fitted to run close in their respective tubular bearings permitting the minimum amount of oil to pass or leak by them due to pressure required to intermittently open this valve.

In practice a very small amount of this motion transmitting fluid is caused to work down past these plungers, which serves to nicely lubricate the same and in order to supply or replenish this tube and maintain the column therein full and intact, I have provided a supply reservoir 28 which is partially filled with oil and which communicates through the pipe 29 and port 30 with the motion transmitting oil column 27 whereby if this oil column should become over heated and thus caused to expand the pressure will be relieved when this port is opened, permitting the surplus to flow back through the bore 30 into the chamber 28. On the other hand, all loss from this column by leaks or other causes is continuously supplied and compensated for at each stroke of the valve cam plunger thereby replenishing and maintaining this motion transmitting column full and intact, which serves to keep the valve in time with the movement of the piston 30 in its cylinder.

In some instances, it is found of advantage to maintain a slight pressure in the reservoir 28 and to accomplish this I have herein shown one means which is that of operating a small air pumping piston 31 by action of valve cam 20 which will draw in air through the inlet 32 and force it through the pipe 33 into the top 34 of the chamber 38 thus creating an air pressure on the body of oil and maintain the oil column 27 full and completely intact.

By my improved hydraulic motion transmitting mechanism I eliminate the great disadvantage of lost motion through mechanical connections between the valve cam and the valve and I obviate both the wear and the noise incident to the operation of such mechanical parts.

I have herein shown and described my motion transmitting mechanism as applied to the valve mechanism of an internal combustion engine but I do not desire to limit myself to this particular application as the same may be employed for transmitting motion in any mechanism in which it may be adapted to operate, and I desire it to be understood that I reserve the privilege of resorting to all the mechanical changes to which the device is susceptible, the invention being defined and limited only by the terms of the appended claims.

I claim:—

1. In an internal combustion engine, a valve, a cam, a motion transmitting hydraulic column operatively connecting the cam and valve, a reservoir communicating with said column, means actuated by said cam for supplying air under pressure to said reservoir, and means for controlling the flow from the reservoir to the column to compensate for expansion and contraction of the column and the adjacent parts to maintain the column intact.

2. In an internal combustion engine, a valve, a cam, a motion transmitting hydraulic column operatively connecting the cam and valve, a reservoir communicating with said column, means actuated by said cam for supplying air under pressure to said reservoir, and a cam actuated valve controlling the flow to and from said reservoir and column to compensate for leakage expansion and contraction.

3. In an internal combustion engine, a valve, a cam, plungers associated one with said valve and one with said cam, a hydraulic column operatively connecting said valve and cam through said plungers, a supply reservoir communicating with said column, means actuated by said cam for supplying air under pressure to said reservoir, and one of said plungers being arranged to control the supply from said reservoir to said column.

4. In an internal combustion engine, a valve, a cam, plungers associated one with said valve and one with said cam, a motion transmitting hydraulic column confined in a tube and arranged to act between both of said plungers, a supply reservoir, means actuated by said cam for supplying air under pressure to said reservoir, and a port opening from said reservoir to said tube and controlled by movement of one of said plungers.

5. In an internal combustion engine, a valve, a valve operating cam, a plunger associated with said valve and a plunger associated to said cam, a motion transmitting hydraulic column communicating with both of said plungers, a tube within which said column is confined, a port hole in said tube, a liquid carrying reservoir communicating with said tube through said port hole, means actuated by said cam for supplying air under pressure to said reservoir, one of said plungers being positioned to open said port near the end of its valve closing stroke and close the same at the first part of its valve opening stroke.

6. A hydraulic motion transmission device comprising a power applying plunger, a work plunger, a conduit connecting said plungers filled with liquid arranged to act between both of said plungers, a liquid carrying reservoir, means for supplying air under pressure to said reservoir, and a port communicating between said conduit and reservoir, said port opening being controlled by the movement of one of said plungers.

7. A hydraulic motion transmission device comprising a power applying plunger, a work plunger, a conduit connecting said plungers filled with liquid arranged to act between both of said plungers, a liquid carrying reservoir, means for supplying air under pressure to said reservoir, and a port positioned to be closed by the first part of the working stroke of the power plunger and opened by the last part of the return stroke of said plunger.

In testimony whereof I affix my signature.

ARTHUR V. DA COSTA.